United States Patent
Tryon et al.

(10) Patent No.: US 9,612,823 B2
(45) Date of Patent: *Apr. 4, 2017

(54) USER-SPECIFIC ROAMING SETTINGS

(71) Applicant: Microsoft Technology Licensing, LLC, Redmond, WA (US)

(72) Inventors: David H. Tryon, Redmond, WA (US); Ilya Kulshin, Redmond, WA (US); Kenneth Leung, Bellevue, WA (US); Skji Conklin, Seattle, WA (US); Marco Saenz, Bothell, WA (US); Kshamta Jerath, Bothell, WA (US); Josef Mirly, Marysville, WA (US); Bradley Willis, Bellevue, WA (US); Bradley Michael Corob, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/955,958

(22) Filed: Dec. 1, 2015

(65) Prior Publication Data

US 2016/0085540 A1    Mar. 24, 2016

Related U.S. Application Data

(63) Continuation of application No. 13/528,948, filed on Jun. 21, 2012, now Pat. No. 9,258,382.

(51) Int. Cl.
G06F 9/44      (2006.01)
G06F 9/445     (2006.01)
H04L 29/08     (2006.01)

(52) U.S. Cl.
CPC .............. *G06F 8/65* (2013.01); *G06F 9/4451* (2013.01); *H04L 67/10* (2013.01); *H04L 67/306* (2013.01)

(58) Field of Classification Search
CPC .......... G06F 8/65; H04L 67/306; H04L 67/10
(Continued)

(56) References Cited

U.S. PATENT DOCUMENTS 7,356,816 B2 *  4/2008  Goodman ........... G06F 9/44505
                                                709/220
7,797,752 B1 *  9/2010  Vaidya ................ H04L 12/4641
                                                717/170
(Continued)

FOREIGN PATENT DOCUMENTS

CN        101410839         4/2009

OTHER PUBLICATIONS

Strickland, How Google Docs Works, howstuffworks.com (Published Sep. 9, 2011), retrieved from https://web.archive.org/web/20110909072717/http://computer.howstuffworks.com/internet/basics/google-docs.htm on Aug. 10, 2014.*

(Continued)

*Primary Examiner* — Lewis A Bullock, Jr.
*Assistant Examiner* — Theodore Hebert

(57) ABSTRACT

Disclosed herein is a roaming settings service that receives an update to roaming settings specific to a user that is initiated by an instance of an application program provisioned according to a first application mode. Upon receiving a request for the roaming settings specific to the user initiated by an instance of the application program provisioned according to a second application model, the roaming settings service retrieves updated roaming settings that reflect the update to the roaming settings. The settings service transfers the updated roaming settings for delivery to the instance of the application program provisioned according to the second application model.

17 Claims, 9 Drawing Sheets

(58) Field of Classification Search
USPC .................................................. 717/168, 172
See application file for complete search history.

(56) References Cited

U.S. PATENT DOCUMENTS

| | | | | |
|---|---|---|---|---|
| 2003/0195921 | A1* | 10/2003 | Becker | H04L 29/06 709/200 |
| 2006/0224602 | A1* | 10/2006 | Rawat | G06F 17/30165 |
| 2008/0057952 | A1* | 3/2008 | Rhim | H04L 12/66 455/433 |
| 2008/0098006 | A1 | 4/2008 | Pedersen et al. | |
| 2009/0106266 | A1* | 4/2009 | Donatelli | H04L 67/306 |
| 2010/0115254 | A1* | 5/2010 | Deng | G06F 9/44505 713/1 |
| 2010/0177642 | A1* | 7/2010 | Sebastian | H04L 12/1859 370/248 |
| 2011/0035424 | A1* | 2/2011 | Rawat | G06F 17/30115 707/829 |
| 2011/0138048 | A1* | 6/2011 | Dawson | G06F 9/4856 709/226 |
| 2011/0153781 | A1* | 6/2011 | Srinivas | G06F 9/4451 709/219 |
| 2011/0179149 | A1* | 7/2011 | Kazan | G06F 9/4451 709/221 |
| 2013/0239089 | A1* | 9/2013 | Eksten | G06F 8/70 717/120 |
| 2013/0346954 | A1* | 12/2013 | Tryon | H04L 67/306 717/168 |

OTHER PUBLICATIONS

Stephens, Table resizing and other niceties in documents, Google (Published Aug. 3, 2010) retrieved from http://googledocs.blogspot.com/2010/08/table-resizing-and-other-niceties-in.html#!/2010/08/table-resizing-and-other-niceties-in.html on Aug. 10, 2014.*

Sinofsky, Steven; "Connecting your Apps, Files, PCs and Devices to the Cloud with SkyDrive and Windows 8;" Feb. 20, 2012; 60 pages; http://blogs.msdn.com/b/b8/archive/2012/02/20/connecting-your-apps_2c00_-files_2c00_-pcs-and-devices-to-the-cloud-with-skydrive-and-windows-8.aspx.

Bradley, Tony; "How to Keep Your Data in Sync Across Platforms and Devices;" PCWorld; May 28, 2011; 7 Pages; http://www.pcworld.com/businesscenter/article/2286981/how_to_keep_your_data_in_sync_across_platforms_and_devices.html.

De, Vaishali; "Building Personalized Applications on the Windows Live ID Platform (cont'd);" DevX_com; Mar. 22, 2012; 4 Pages; http://www.devx.com/codemag/Article/38079/0/page/3.

Strickland, Jonathan; "How Google Docs Works", howstuffworks.com (Published Sep. 9, 2011), retrieved from https://web.archive.org/web/20110909072717/http://computer.howstuffworks.com/internet/basics/google-docs.htm on Aug. 10, 2014; 12 pages.

Stephens, "Table resizing and other niceties in documents", Google (Published Aug. 3, 2010) retrieved from https://googledocs.blogspot.com/2010/08/table-resizing-and-other-niceties-in.html#!/2010/08/table-resizing-and-other-niceties-in.html on Aug. 10, 2014, 3 pages.

"Non-Final Office Action from U.S. Appl. No. 13/528,948", Mailed Date: Aug. 15, 2014, 28 pages.

"Final Office Action from U.S. Appl. No. 13/528,948", Mailed Date: Mar. 26, 2015, 29 pages.

"Notice of Allowance and Fees Due from U.S. Appl. No. 13/528,948", Mailed Date: Sep. 1, 2015, 15 pages.

"International Search Report and Written Opinion for PCT Patent Application No. PCT/US2013/045753", Mailed Date: Feb. 10, 2014, Filed Date: Jun. 14, 2013, 10 pages.

"Rule 161 (1) and 162 EPC from EP 13732039.6", mailed Feb. 25, 2015, 2 pages.

"First Office Action and Search Report Issued in Chinese Patent Application No. 201380032654.6", Mailed Date: Dec. 5, 2016, 9 pages.

* cited by examiner

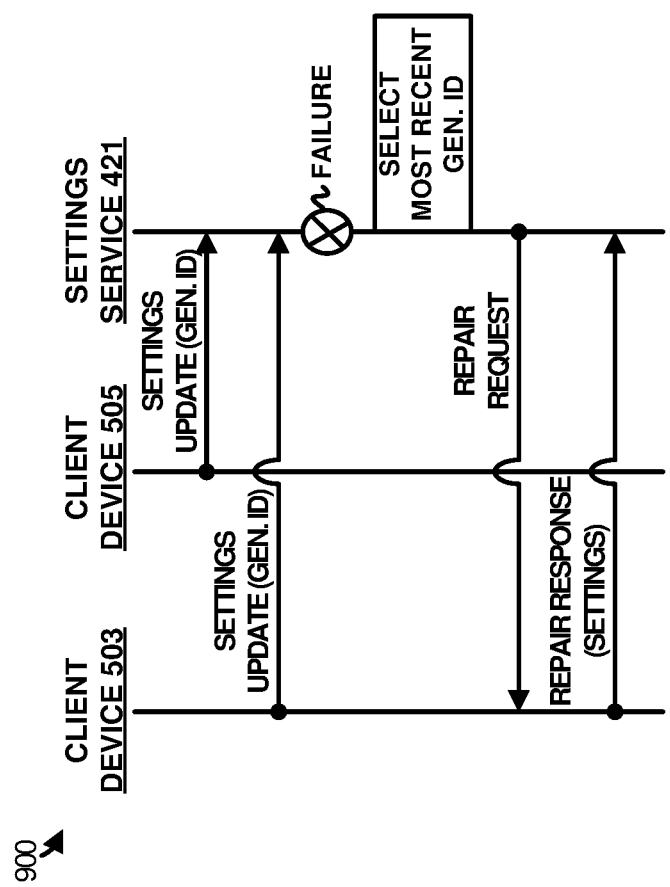

USER-SPECIFIC ROAMING SETTINGS

RELATED APPLICATIONS

This application is a continuation of and claims priority to U.S. patent application Ser. No. 13/528,948, filed on Jun. 21, 2012, and entitled "USER-SPECIFIC ROAMING SETTINGS," and which is incorporated by reference in its entirety.

TECHNICAL BACKGROUND

Application settings allow preferences, states, and other characteristics of an application environment to be stored and applied when the user engages with the application environment. A list of most recently used files, custom dictionaries, and viewing preferences are examples of settings that can be applied upon launching an application, such as a word processing, spreadsheet, email, presentation, social networking, or gaming application.

A wide variety of application models exist by which users may experience application environments and content. For example, applications may be installed and executed locally, hosted by web-based platforms, or streamed over networks for local execution, among other techniques. Countless types of computing devices may be used, such as desktop and laptop computers, tablets, netbooks, ultra-books, e-readers, mobile phones, Internet browsing appliances, and gaming consoles.

Settings can be managed across diverse application experiences in a variety of ways. Some solutions provide client programs that monitor for and intercept settings-related calls between application programs and operating system elements. In this manner, settings established by a user on one device can be communicated to other devices accessed by the same user.

With respect to some shared document environments, settings can be applied globally such that each version of a shared document inherits the same settings as every other version. For example, the last page of a shared document accessed by any user can be presented to every other user upon opening the shared document.

Overview

Provided herein are systems, methods, and software for facilitating a roaming settings service. In particular, user-specific settings may roam between instances of applications provisioned according to differing application models.

In one implementation, a roaming settings service receives an update to roaming settings specific to a user that is initiated by an instance of an application program provisioned according to a first application model. Upon receiving a request for the roaming settings specific to the user initiated by an instance of the application program provisioned according to a second application model, the roaming settings service retrieves updated roaming settings that reflect the update to the roaming settings. The settings service transfers the updated roaming settings for delivery to the instance of the application program provisioned according to the second application model.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 9 is a sequence diagram that illustrates an operational exchange within a computing environment when providing a roaming settings service in an implementation.

TECHNICAL DISCLOSURE

Figure 1:
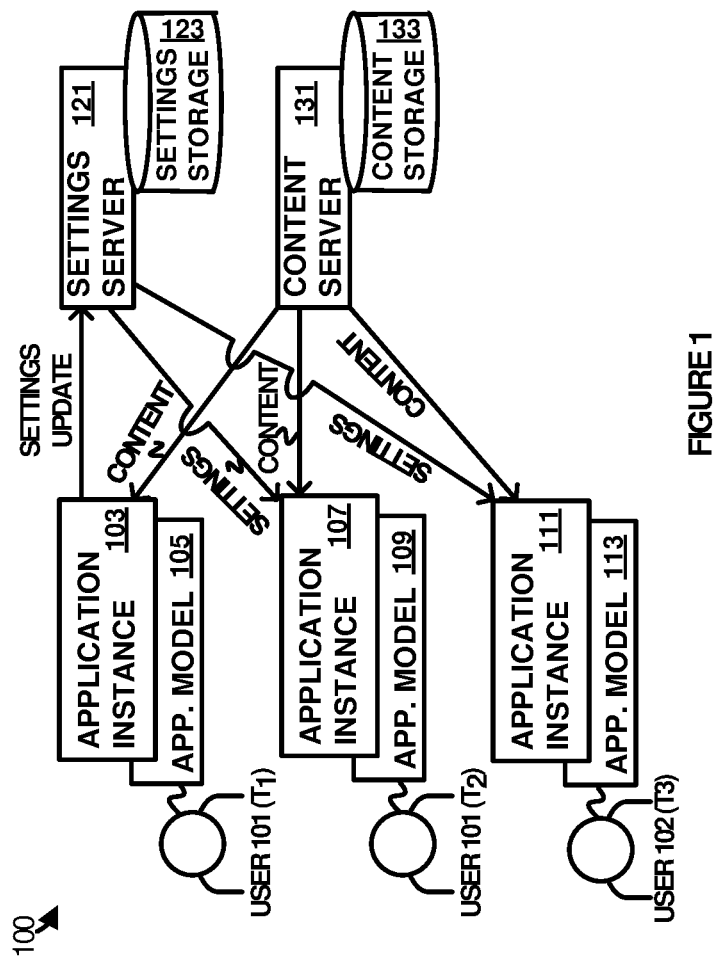
FIG. 1 illustrates the operation of a roaming settings service in an implementation.

Implementations described herein provide for improved application experiences by facilitating roaming settings on a user-specific basis. Roaming settings established when engaged with an application provisioned according to one application model may be enjoyed when engaged with the same application, but provisioned according to a different application model. In fact, the roaming settings may also be applicable to different applications, not just different instances of the same application.

In a brief example, a user may establish settings when engaged with a productivity application locally installed on his or her desktop or laptop computer. Then when subsequently engaged with the same application by way of a hosted application model or a streaming application model, the same settings can be enjoyed by the user. In this manner, the user may enjoy a common application experience across various instances of an application, regardless of the provisioning model through which the application is delivered. As mentioned, the roaming settings may also be applicable to a different application. For instance, the user may be engaged with a different productivity application, such as one provided within an application suite along with the other productivity application. All or portions of the roaming settings specific to the user may be retrieved and applied by the different application.

In an implementation, a settings service functions to accomplish the aforementioned roaming of user-specific settings across differing application models and different applications. User-specific settings may be communicated to the settings service by various instances of an application provisioned in a variety of ways. As a user engages with the application by way of the various provisioning models, the settings service can communicate settings for that user, thereby allowing that instance of the application to render a familiar application experience. As the user migrates to different instances of the application, the settings associated with the user can be updated to the settings service and migrated to the next instance of the application along with the user, regardless of how the next instance of the application is provisioned.

A variety of provisioning models may be accommodated by the settings service and should not be limited to those discussed herein. Locally installed instances, hosted instances, and streaming instances are just some examples of provisioning models, including combinations or variations thereof. For example, some instances of an application may first be provided in a streaming manner, but then installed locally and executed therefrom. In another example, some instances of an application may include components that execute remote from a local device engaged by a user, but may also include other components that execute on the local device, possibly within another local application, such as a browser.

The underlying device through which a user may engage an application may also vary and can contribute to the variety of provisioning models accommodated by the settings service. For example, users may engage with applications using desktop computers, laptop computers, tablet computers, mobile phones, media devices, music players, video devices, and Internet appliances, as well as any other type of computing device capable of providing applications according to a provisioning model.

A variety of application programs may also be accommodated by the settings service and should not be limited to just those discussed herein. Communication applications, productivity applications, gaming applications, entertainment applications, browsing applications, and social network applications, as well as any combination or variation thereof, are just some examples of applications that can be provisioned according to a variety of provisioning models. Examples of productivity applications include but are not limited to document editing applications, spreadsheet applications, presentation applications, and database applications.

In another brief example, a user may engage with a locally installed instance of a productivity application by way of his or her laptop computer. While working with that instance of the application, settings associated with the user may be tracked or otherwise determined by the application. A list of most recently used documents, a custom dictionary, and a page in a document last accessed by the user are examples of settings, although it should be understood that other types of settings, combinations of settings, or variations thereof are possible.

As the user engages with the productivity application, the settings may change. For instance, the list of most recently used document may change, words may be added to the custom dictionary, or the last page accessed in the document may change. Accordingly, the instance of the application installed and executing locally on the laptop computer can communicate updated settings to the settings service. The settings service stores the updated settings in association with the user so that updated settings may be subsequently retrieved and provided to another instance of the application.

Continuing with this example, the user may engage again with the same productivity application, but an instance of it provisioned differently, such as a hosted version of the application. The hosted version may be accessed by way of a web browser application running on the same laptop computer or a different computing device entirely. Upon engaging with the hosted instance of the productivity application, the updated settings specific to the user are retrieved from the settings service such that the user can enjoy a familiar experience as when engaged with the application by way of the locally installed instance. For instance, were the user to open a document, the document may be opened to the most recently accessed page, such as the page last accessed on the laptop.

In a variation of the foregoing example, the referenced document may be a shared productivity document such that multiple users are able to access the document. In this case, the user may be returned to the specific page that he or she last accessed, while other users may be returned to other pages that they last accessed, rather than returning each user to the last page accessed by any of the users.

Figure 2:
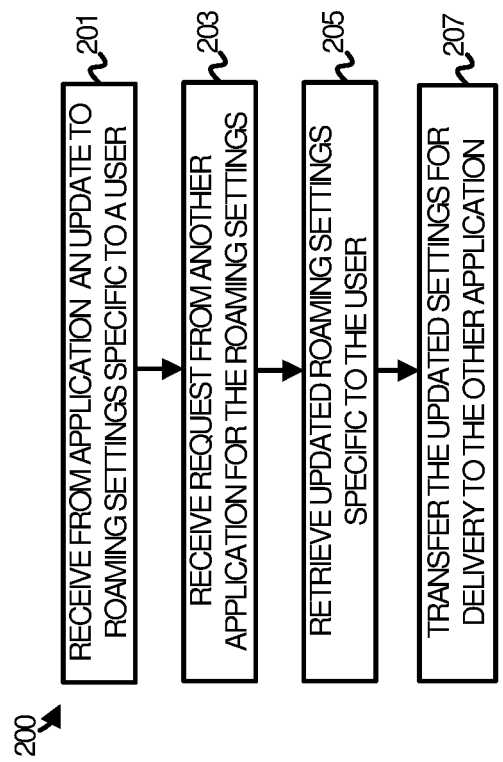
FIG. 2 illustrates a process executed by a settings server to provide a roaming settings service in an implementation.
Figure 3:
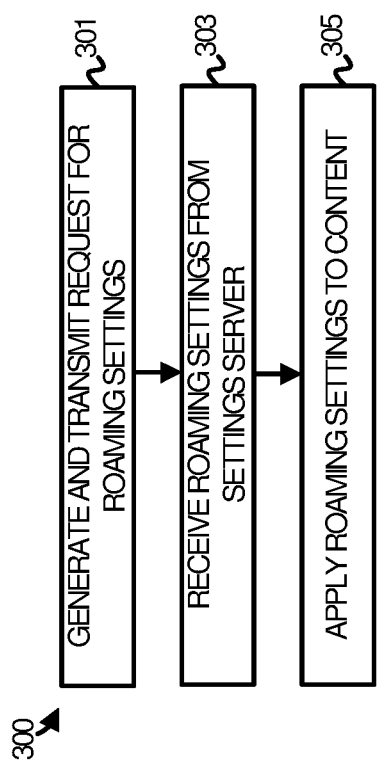
FIG. 3 illustrates a process executed by an application instance to provide a roaming settings service in an implementation.
Figure 4:
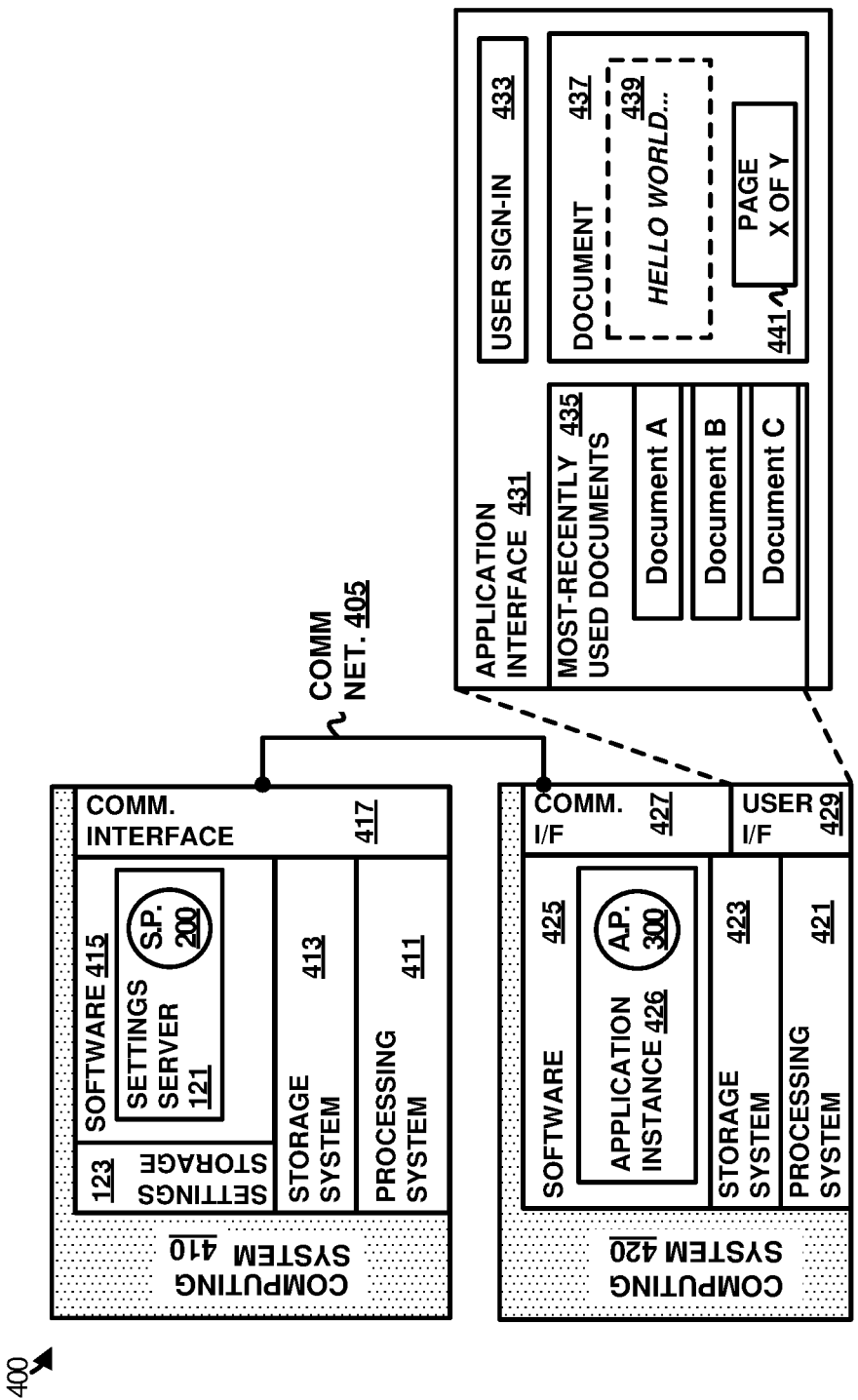
FIG. 4 illustrates a computing environment for providing a roaming settings service in an implementation.
Figure 5:
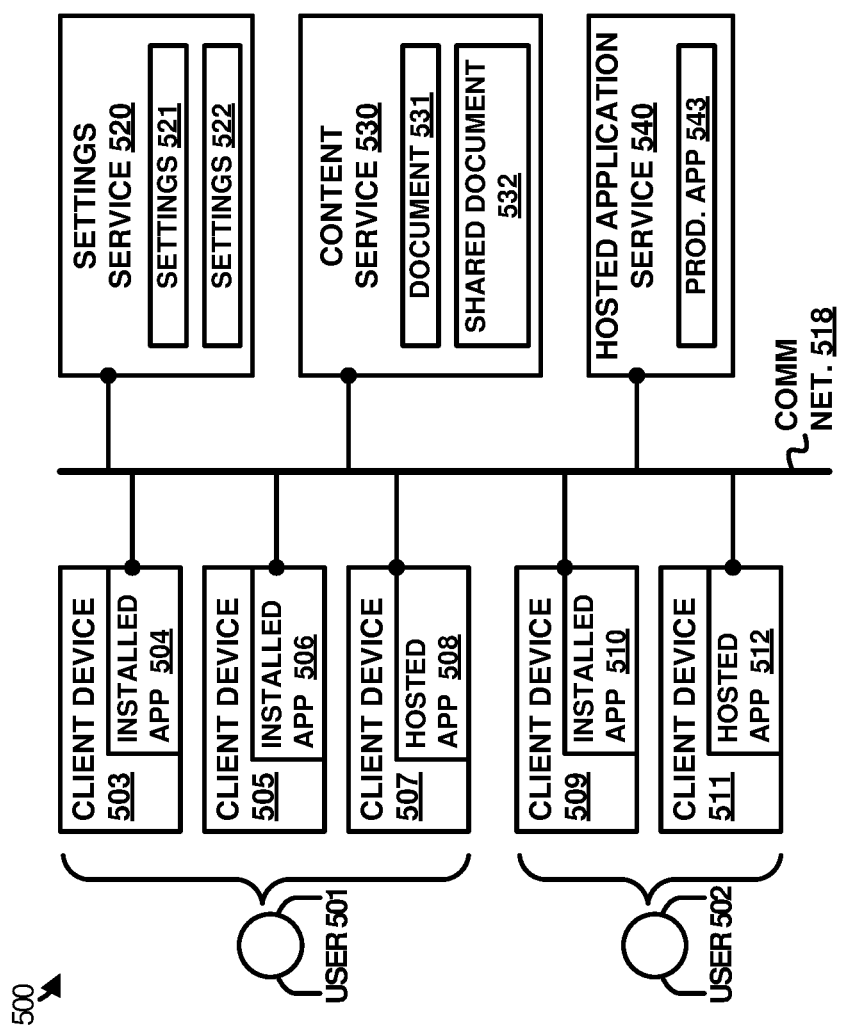
FIG. 5 illustrates a computing environment for providing a roaming settings service in an implementation.

Referring now to the drawings, FIGS. 1-3 illustrate the operation of a roaming settings service, as well as a computing environment and process for implementing the service. In particular, FIG. 1 illustrates operations of roaming settings service, while FIG. 2 and FIG. 3 illustrate processes for providing the service. FIG. 4 illustrates a computing environment suitable for implementing the roaming settings service and processes. FIG. 5 illustrates another computing environment within which a roaming settings service may be implemented, while FIGS. 6-9 illustrate various operational exchanges within the computing environment in the context of providing the roaming settings service.

Turning now to FIG. 1, roaming environment 100 includes application instance 103 provisioned according to application model 105, application instance 107 provisioned according to application model 109, and application instance 111 provisioned according to application model 113. Roaming environment 100 also includes settings server 121 and settings storage 123, as well as content server 131 and content storage 133.

In operation, user 101 initially (T1) engages application instance 103 provisioned according to application model 105. For example, content may be retrieved from content storage 133 by content server 131 and communicated to application instance 103, allowing user 101 to work with the content. It should be understood that user 101 may engage application instance 103 without retrieving content from content server 131. As used herein, content may refer to a content item, such as a photo, document, spreadsheet, presentation, video, or the like. However, content may also refer to a collection of content items, such as several documents, spreadsheets, presentations, or the like.

Upon engaging and working with application instance 103, a settings update is initiated and communicated to settings server 121. The settings update may include changes made to user-specific settings on behalf of user 101, possibly indicative of interactions had by the user with respect to the content. Settings server 121 updates settings associated with user 101 in settings storage 123 to reflect the changes. User interactions with content are well known and the capture thereof is generally supported by most productivity applications. For example, many productivity applications are capable of recording, noting, or otherwise storing information corresponding to user interactions, such as what page or point in a document was reached before closing the document. User interactions are generally received by way of a user interface, including user interface devices and corresponding software.

At a later time (T2), user 101 may engage application instance 107 provisioned according to application model 109. Upon engaging application instance 107, settings specific to user 101 are communicated to application instance 107 by settings server 121. The settings may reflect the changes made earlier by way of the settings update by application instance 103. Content may also be retrieved from content storage 133 and provided by content server 131 to application instance 107. The content may be the same item or items provided earlier by content server 131 to application instance 103. In a scenario where the content is the same content as accessed by application instance 103, at least a portion of the settings obtained by application instance 107 may apply to the content. In other words, user 101 may enjoy common settings applied to the content, whether accessing the content by way of application instance 103, provisioned according to one model, or application instance 107, provisioned according to another model.

At yet another time (T3), a different user, user 102, may engage application instance 111 provisioned according to application model 113. Upon engaging application instance 111, settings specific to user 102 are communicated to application instance 111 by settings server 121. Content may also be retrieved from content storage 133 and provided by content server 131 to application instance 111.

In fact, the content may be the same item or items provided earlier by content server 131 to either or both application instance 103 and application instance 105. For instance, the content may be shared content. Under such circumstances, the settings specific to user 102 may be applied to the shared content by application instance 111, allowing user 102 to experience settings different from those applied to the content on behalf of user 101.

FIG. 2 illustrates server process 200 that may be implemented within roaming environment 100 by settings server 121 to provide at least a portion of a roaming settings service. To begin, settings server 121 receives a settings update from an application instance specific to a user (step 201). It should be understood that settings to which the update is applied may have been previously established during operation of the same application instance, a different application instance, or a different application entirely. Next, settings server 121 receives a request from another application instance for the roaming settings specific to the user (step 205). Settings server 121 retrieves the roaming settings specific to the user (step 205) and transfers them for delivery to the other application instance (step 207).

FIG. 3 illustrates application process 300 that may be implemented by an of application instances 103, 107, and 111 to provide at least a portion of a user-specific roaming settings service. To begin, the application instance generates and transmits a request for the user-specific roaming settings to settings service 121 (step 301). The application instance may also optionally obtain content from content server 131. Upon receiving the roaming settings (step 303), the application instance applies the user-specific settings within the application instance, including optionally to the content or portions of an application instance involving the content.

Referring now to FIG. 4, a computing environment 400 suitable for implementing a roaming settings service is illustrated. Computing environment 400 includes computing system 410 and computing system 420. Computing system 410 is generally representative of any computing system or systems on which settings server 121 may be suitably implemented. Computing system 420 is generally representative of any computing system(s) on which application instances 103, 107, and 111 may be suitably implemented according to application models 105, 109, and 113 respectively. Examples of application models 105, 109, and 113 include but are not limited to a local installation model, a hosted application model, and a streaming application model.

Examples of computing system 410 include server computers, virtual machines, and distributed computing systems, as well as any other combination or variation thereof. Examples of computing system 420 include personal computers, server computers, client computers, mobile computers, media devices, Internet appliances, desktop computers, laptop computers, tablet computers, notebook computers, mobile phones, smart phones, gaming devices, and personal digital assistants, as well as any combination or variation thereof.

Computing system 410 includes processing system 411, storage system 413, software 415, and communication interface 417. Processing system 411 is operatively coupled with storage system 413 and communication interface 417. Processing system 411 loads and executes software 415 from storage system 413, including settings server 421. When executed by computing system 410 in general, software 415 directs computing system 410 to operate as described herein for server process 200.

Computing system 410 may optionally include additional devices, features, or functionality. For example, computing system 410 may optionally have input devices, such as a keyboard, a mouse, a voice input device, a touch input device, a gesture input device, or other comparable input devices. Output devices such as a display, speakers, printer, and other types of comparable input devices may also be included. These devices are well known in the art and need not be discussed at length here.

Referring still to FIG. 4, processing system 411 may comprise a microprocessor and other circuitry that retrieves and executes software 415 from storage system 413. Processing system 411 may be implemented within a single processing device but may also be distributed across multiple processing devices or sub-systems that cooperate in executing program instructions. Examples of processing system 411 include general purpose central processing units, application specific processors, and logic devices, as well as any other type of processing device, combinations of processing devices, or variations thereof.

Storage system 413 may comprise any storage media readable by processing system 411 and capable of storing software 415 and settings storage 123. Storage system 413 may include volatile and nonvolatile, removable and non-removable media implemented in any method or technology for storage of information, such as computer readable instructions, data structures, program modules, or other data. Storage system 413 may be implemented as a single storage device but may also be implemented across multiple storage devices or sub-systems. Storage system 413 may comprise additional elements, such as a controller, capable of communicating with processing system 411.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media may be a non-transitory storage media. In some implementations, at least a portion of the storage media may be transitory. It should be understood that in no case is the storage media a propagated signal.

Software 415 includes settings server 121, which implements server process 200. Settings server 121 may be implemented in server program instructions and among other functions may, when executed by computing system 410, direct computing system 410 to process requests to identify updated roaming settings associated with users that reflect updates to the roaming settings and transfer updated roaming settings for delivery to clients.

Software 415 may include additional processes, programs, or components in addition to settings server 121, such as operating system software or other application software. Software 415 may also comprise firmware or some other form of machine-readable processing instructions capable of being executed by processing system 411.

In general, software 415 may, when loaded into processing system 411 and executed, transform processing system 411, and computing system 410 overall, from a general-purpose computing system into a special-purpose computing system customized to facilitate a roaming settings service as described herein for each implementation. Indeed, encoding software 415 on storage system 413 may transform the physical structure of storage system 413. The specific transformation of the physical structure may depend on various factors in different implementations of this description. Examples of such factors may include, but are not limited to the technology used to implement the storage media of storage system 413 and whether the computer-storage media are characterized as primary or secondary storage.

For example, if the computer-storage media are implemented as semiconductor-based memory, software 415 may transform the physical state of the semiconductor memory when the program is encoded therein. For example, software 415 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 410 is generally intended to represent an element of computing environment 400 in which settings server 121 could be deployed and executed. However, computing system 410 may also represent other elements in computing environment 400 (not shown) on which at least settings server 121 may be staged and from where settings server 121 may be transported, downloaded, or otherwise provided to another computing system, similar to computing system 410, for execution.

Referring again to FIG. 1, through the operation of computing system 410 employing software 415, and settings server 121 in particular, transformations may be performed with respect to server process 200. As an example, computing system 410 could be considered transformed from one state to another by the handling of user-specific settings updates. In a first state, user-specific settings are stored in settings storage 123 on storage system 413. Upon receiving settings updates, the user-specific settings may be updated to reflect the changes represented in the updates, thereby changing computing system 410 to a second, different state.

Referring again to FIG. 4, communication interface 417 may include communication connections and devices that allow for communication between computing system 410 and computing system 420, as well as with other computing systems not shown, over a communication network 405. Examples of connections and devices that together allow for inter-system communication include network interface cards, antennas, power amplifiers, RF circuitry, transceivers, and other communication circuitry. The aforementioned network, connections, and devices are well known and need not be discussed at length here.

With respect to computing system 420, several elements are included that are similar to those found in computing system 410 and need not be discussed at length here, including processing system 421, storage system 423, and communication interface 427. Computing system 420 also includes software 425 and user interface 429, discussed in more detail below. Processing system 421 is operatively coupled with storage system 423, communication interface 427, and user interface 429. Processing system 421 loads and executes software 425 from storage system 423, including application instance 426, representative of application instances 103, 107, and 111. When executed by computing system 420 in general, and processing system 421 in particular, software 425 directs computing system 420 to operate as described herein for application process 300.

Software 425 includes application instance 426, which implements application process 300. Application instance 426 may be implemented in application program instructions and among other functions may, when executed by computing system 420, direct computing system 420 to process requests to request, receive, and apply user-specific roaming settings. The application program instructions may also include or be referred to as client program instructions. Software 425 may include additional processes, programs, or components in addition to application instance 426, such as operating system software or other application software. Software 425 may also comprise firmware or some other form of machine-readable processing instructions executable by processing system 421.

In general, software 425 may, when loaded into processing system 421 and executed, transform processing system 421, and computing system 420 overall, from a general-purpose computing system into a special-purpose computing system customized to facilitate a roaming settings service as described herein for each implementation. Indeed, encoding software 425 on storage system 423 may transform the physical structure of storage system 423. The specific transformation of the physical structure may depend on various factors in different implementations of this description. Examples of such factors may include, but are not limited to the technology used to implement the storage media of storage system 423 and whether the computer-storage media are characterized as primary or secondary storage.

For example, if the computer-storage media are implemented as semiconductor-based memory, software 425 may transform the physical state of the semiconductor memory when the program is encoded therein. For example, software 425 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 420 is generally intended to represent an element of computing environment 400 in which an application instance could be deployed and executed. However, computing system 420 may also represent other elements in computing environment 400 (not shown) on which at least the application instance may be staged and from where the application instance may be transported, downloaded, or otherwise provided to another computing system for execution.

Referring again to FIG. 1, through the operation of computing system 420 employing software 425, and application instance 426 in particular, transformations may be performed with respect to roaming environment 100. As an example, computing system 420 could be considered transformed from one state to another by the handling of user-specific settings updates. In a first state, an application instance is launched without user-specific settings. Upon requesting and receiving user-specific settings, the application instance may be changed to reflect the settings, thereby changing computing system 420 to a second, different state.

User interface 429 may include a mouse, a voice input device, a touch input device for receiving a gesture from a user, a motion input device for detecting non-touch gestures and other motions by a user, and other comparable input devices and associated processing elements capable of receiving user input from a user. Output devices such as a display, speakers, printer, haptic devices, and other types of output devices may also be included in user interface 429. The aforementioned user input devices are well known in the art and need not be discussed at length here.

Application interface 431 may be generated by application instance 426 and displayed by user interface 429. Application interface 431 illustrates several example user-specific roaming settings that may be communicated to application instance 426. It should be understood that the settings are merely exemplary and should not be limited to those disclosed herein. The settings include a list of most recently used documents 435, a formatting style in a text block 439 within a document 437, and a page 441 most recently accessed in the document on behalf of a user associated with the user-specific settings.

In operation, application instance 426 functions to retrieve user-specific settings associated with a user identified by way of user sign-in module 433. The sign in may be integrated within application instance 426, but may be integrated with other elements executing on computing system 420, such as other applications or operating system elements. It should be understood that the user may be identified by other means, in addition to or in place of user sign-in module 433.

As the user interacts with application interface 431, the settings may change, thus triggering or otherwise prompting an update to settings server 121. For example, document 437 may be added to or replace one of documents A, B, and C in the list of most recently used documents 435. As the user navigates through document 437 to a different page, the most recently access page may change from page X to a different page. Similarly, the user may decide to change the format of the text block 439. Application instance 426 may communicate these changes to settings server 121 for storage in association with the user.

Then, upon engaging with another application instance, perhaps implemented on computing system 420 or some other similar device, the updated user settings may be retrieved from settings server 121 and loaded or otherwise rendered by an application interface to the other application instance. In this manner, the same user is able to enjoy the same settings as when previously engaged with application instance 426. For example, the user may be presented with a familiar list of most recently used documents, returned to the last page accessed in a document, and presented with familiar formatting.

FIG. 5 illustrates computing environment 500 in which a roaming settings service may be implemented. Computing environment 500 includes client device 503, client device 505, and client device 507, all generally associated with user 501 for illustrative purposes. Computing environment 500 also includes client device 509 and client device 511, both generally associated with user 502 for illustrative purposes. A client computing system, such as a personal computer, laptop computer, tablet computer, mobile phone, media device, music player, and video device, is an example of client devices 503, 505, 507, 509, and 511.

Client devices 503, 505, 507, 509, and 511 at various times may communicate over communication network 518 with settings service 520, content service 530, and hosted application service 540. Settings service 520 may be implemented on a server computing system, such as computing system 410 illustrated in FIG. 4. Hosted application service 540 may be implemented on an application server, which itself may be a computing system similar to computing systems 410 and 420.

Client devices 503, 505, and 507 operated by user 501 each include application instances provisioned according to various provisioning models. In particular, client device 503 includes installed application 504. Similarly, client device 505 includes installed application 506. Client device 507 includes hosted application 508.

Client devices operated by user 502 also each include application instances provisioned according to various provisioning models. Client device 509 includes installed application 510, while client device 511 includes hosted application 512.

It should be understood that each device may have other additional application instances either similar to or different than the application instances discussed herein. In addition, in should be understood that the other application instances may be provisioned according to similar models as the application instances illustrated in computing environment 500. However, the application instances may be provisioned according to other provisioning models not illustrated, such as a streaming application model or any combination or variation of provisioning models contemplated herein.

It should be understood that, while user-specific settings may be applicable to similar application instance, user-specific settings may also be applicable to different types of applications. In addition, each application instance may be an instance of the same application as every other application instance. For example, each application instance may be a productivity application, and in particular a word processing application.

However, it is also possible that each application instance, or at least one of the application instances, is an instance of a different application than the other application instances. For example, while some application instances may be instances of a productivity application, another application instance may be an instance of a gaming application. In yet another example, while some applications may be instances of word processing application, another application instance may be an instance of a spreadsheet application.

Settings service 520 includes settings 521 and settings 522. Settings 521 are representative of settings corresponding to user 501 capable of being roamed to and from client devices 503, 505, and 507, as well as any other client device that may from time to time be associated with user 501. Settings 522 are representative of settings corresponding to user 502 capable of being roamed to and from client devices 509 and 511, as well as any other client device that may from time to time be associated with user 502.

Content service 530 includes document 531 and shared document 532. Content service 530 may be any system or service capable of storing content that can be loaded by or otherwise hosted by application programs, such as productivity applications. Content service 530 may be an integrated service such that it is operated by the same entity that operates settings service 520. However, content service 530 may be operated by an entity other than the entity that operates settings service 520. In other words, content service 530 may be a third-party storage service that allows for remote or cloud-based storage of content items. However, content service 530 may also be an integrated storage service provided by the same entity that provides settings service 520.

In operation, user 501 may engage any of the application instances on client devices 503, 505, and 507. As part of engaging with the application instance, user 501 can be identified to the application instance. For example, user 501 may sign-in to the application instance. The application instance then communicates the identity of user 501 to settings service 520 to obtain settings 521, which are specific to user 501.

As user 501 works with the application instance, updates to settings 521 are provided to settings service 520. Then when user 501 engages with the same application instance or another application instance, on the same client device or a different client device, the user can again be identified and settings 521 retrieved on behalf of user 521. The other application instance can thus load settings 521 and present user 501 with a similar application interface, configured in view of settings 521, as enjoy when engaged with the initial application instance.

The type of application instance can vary and settings specific to user 501 can still be provided and facilitated by the application. For instance, settings updated from a locally installed application can be roamed to a hosted instance, such as a web-based instance, of an application. Thus, whether working with an application installed directly on a client device or with a version of the application hosted on a remote server, user 501 is able to experience the same settings.

It should be noted that at least a portion of settings 521 may pertain to specific content items stored by content service 530, such as document 531 or shared document 532. Thus, the client device operated by user 501 may request settings from settings service 520 and content from content service 530. Settings 521 can then be applied to content regardless of what device or application instance, or combination thereof, is being used by user 501 to access the content.

In the case of settings applied to shared document 532, such settings allow user 501 to experience shared document 532 in a customized manner relative to user 502. For example, settings 521 may identify the last page accessed by user 501 in shared document 532, while settings 522 may identify the last page accessed by user 502.

Further in operation, user 502 may engage any of the application instances on client devices 509 and 511. As part of engaging with the application instance, user 502 can be identified to the application instance. For example, user 502 may sign-in to the application instance. The application instance then communicates the identity of user 502 to settings service 520 to obtain settings 522, which are specific to user 502.

As user 502 works with the application instance, updates to settings 522 are provided to settings service 520. Then when user 502 engages with another application instance, on the same client device or a different client device, the user can again be identified and settings 522 retrieved on behalf of user 502. The other application instance can thus load settings 522 and present user 502 with a similar application interface, configured in view of settings 522, as enjoy when engaged with the initial application instance.

It should be noted that at least a portion of settings 522 may pertain to shared content items, such as shared document 532. Thus, the client device operated by user 502 may request settings from settings service 520 and content from content service 530. Settings 522 can then be applied to content regardless of what device or application instance, or combination thereof, is being used by user 502 to access the content.

In the case of settings applied to shared document 532, such settings allow user 502 to experience share document 532 in a customized manner relative to user 501. For example, settings 522 may identify the last page accessed by user 502 in shared document 532, while settings 521 may identify the last page accessed by user 501.

Referring now to FIGS. 6-9, several sequence diagrams are illustrated that describe operational exchanges within computing environment 500 when providing a roaming settings service in an implementation.

Figure 6:
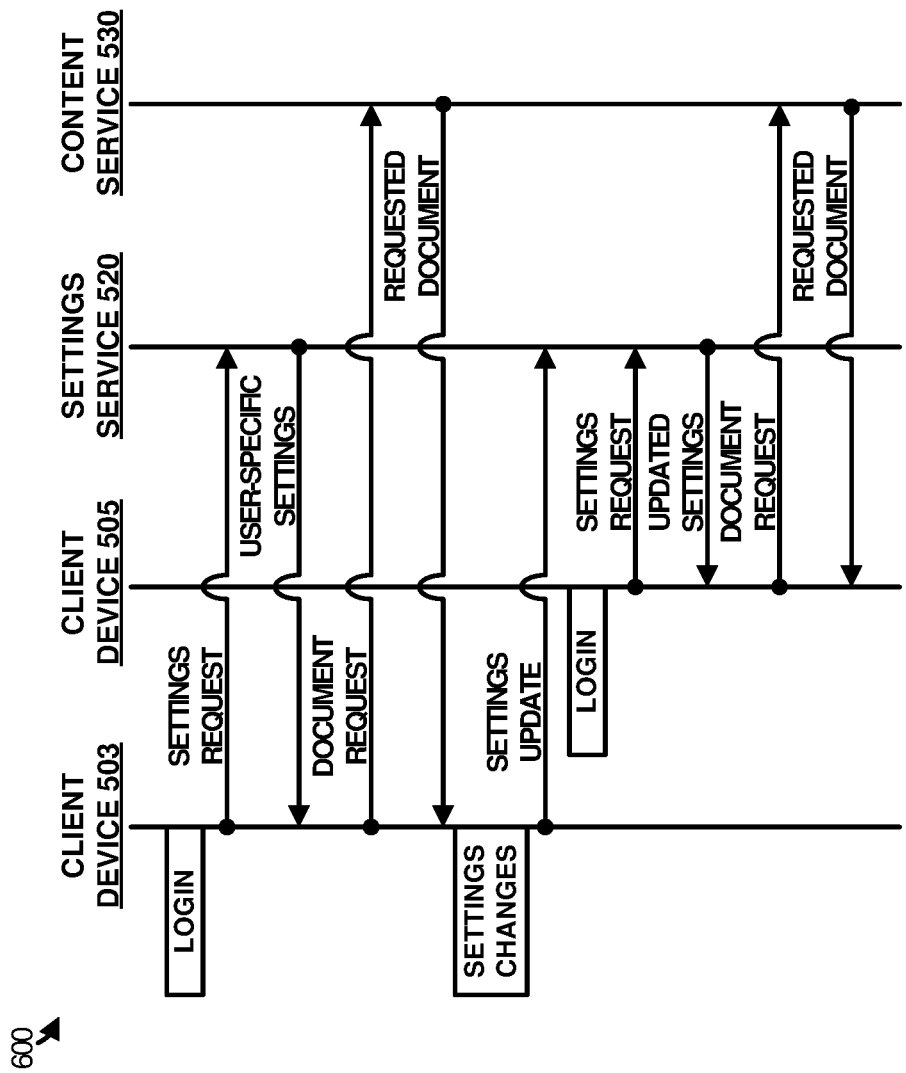
FIG. 6 is a sequence diagram that illustrates an operational exchange within a computing environment when providing a roaming settings service in an implementation.

Turning to FIG. 6, operational exchange 600 illustrates an example whereby settings specific to user 501 are roamed between two different client devices having installed application instances running thereon. Initially, user 501 logs into or otherwise is identified to installed application 504 on client device 503. Upon user 501 being identified, installed application 504, by way of client device 503, initiates a settings request that is transferred for delivery over communication network 518 to settings service 520. The settings request identifies user 501, allowing settings service 520 to retrieve settings 521 specific to user 521. Settings service 521 returns settings 521 to client device 503 for loading or configuration in installed application 504.

At the same time, before, or after the settings request, installed application 504 also initiates retrieval of document 531 from content service 530. Content service 530 provides document 531 to client device 503. Installed application 504 can then apply portions of settings 521 relevant to document 531.

As user 501 works with installed application 504, possibly making changes to installed application 504, document 531, or other aspects of the application environment generated by installed application 504, changes to settings 531 are monitored and provided in a settings update to settings service 520. Settings service 520 receives the changes and updates the stored copy of settings 521 to reflect the changes.

At a later time, user 501 engages with installed application 506 on client device 505. User 501 again is identified by way or a login or some other identification mechanism. The login may be associated with installed application 506, an application environment associated with installed application 506, or even an operating system environment associated with installed application 506. Alternatively, the login may be associated with content service 530. For example, user 501 may login to a client application associated with content service 530 in order to gain access to documents and other content stored by content service 530. This identity may then be used to identify user 501 to settings service 520.

Installed application 506 initiates a request for settings by way of client device 505, which is transferred for delivery to settings service 520 over communication network 518. Settings service 520 receives the request and responsively retrieves the updated version of settings 521 and provides the settings 521 in their updated form to installed application 506. Installed application 506 may also retrieve document 531 from content service 530. Content service 530 provides document 531 to client device 505. Installed application 506 can then apply portions of settings 521 relevant to document 531, thereby allowing user 501 to experience document 531 by way of installed application 506 in a manner similar to when experienced through installed application 504 on client device 503.

Figure 7:
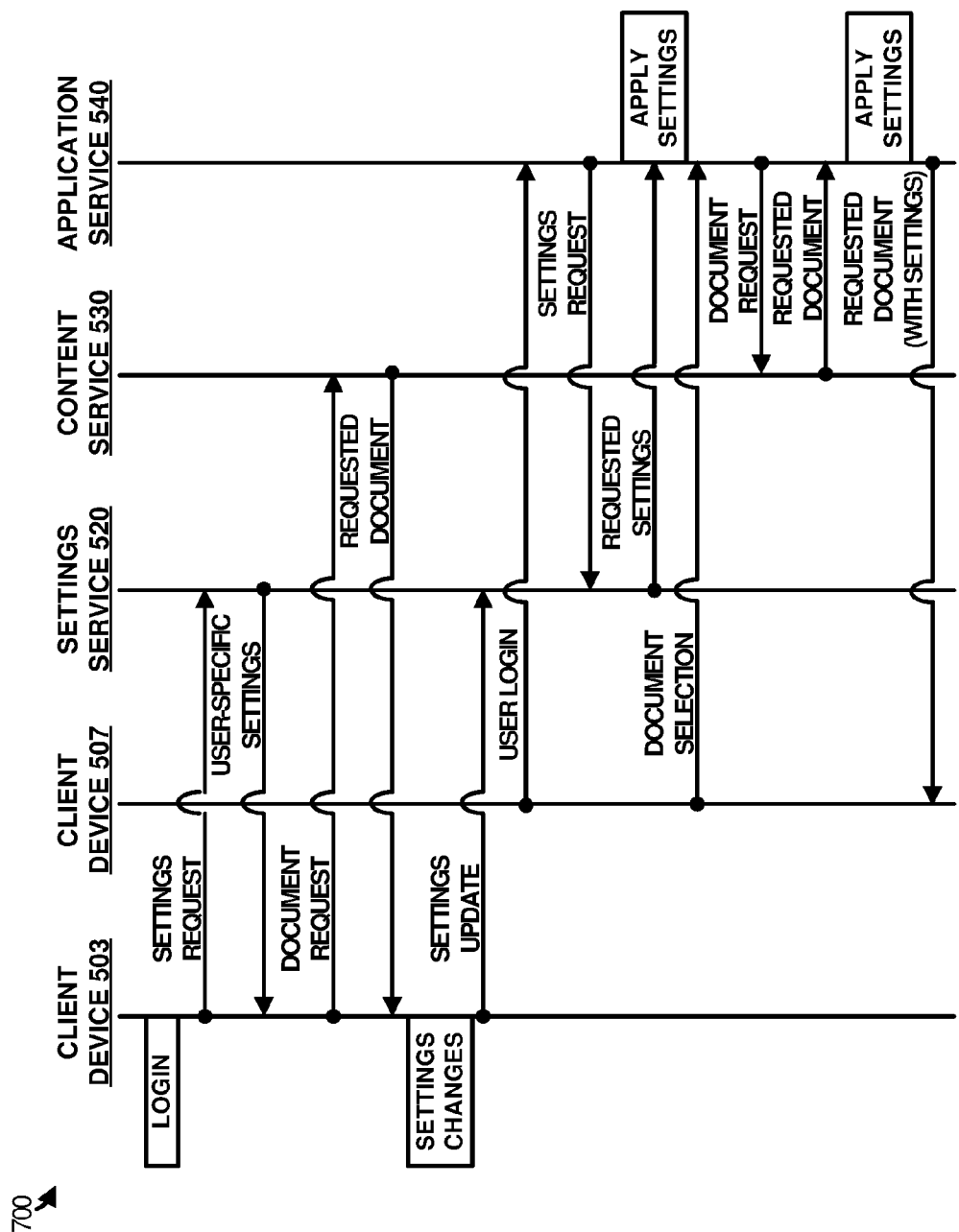
FIG. 7 is a sequence diagram that illustrates an operational exchange within a computing environment when providing a roaming settings service in an implementation.

FIG. 7 illustrates an operational exchange 700 whereby settings specific to user 501 are roamed between two different client devices having application instances of different types running thereon. Namely, settings 521 are roamed between an installed instance of an application and a hosted instance of the application.

Initially, user 501 logs into or otherwise is identified to installed application 504 on client device 503. Upon user 501 being identified, installed application 504, by way of client device 503, initiates a settings request that is transferred for delivery over communication network 518 to settings service 520. The settings request identifies user 501, allowing settings service 520 to retrieve settings 521 specific to user 501. Settings service 520 returns settings 521 to client device 503 for loading in installed application 504.

At the same time, before, or after the settings request, installed application 504 also initiates retrieval of document 531 from content service 530. Content service 530 provides document 531 to client device 503. Installed application 504 can then apply portions of settings 521 relevant to document 531.

As user 501 works with installed application 504, possibly making changes to installed application 504, document 531, or other aspects of the application environment generated by installed application 504, changes to settings 521 are monitored and provided in a settings update to settings service 520. Settings service 520 receives the changes and updates the stored copy of settings 521 to reflect the changes.

At a later time, user 501 engages with hosted application 508 on client device 507. User 501 is identified by way or a login or some other identification mechanism to application service 540, which hosts productivity application 543 and provides instance of it to client device 507, represented by hosted application 508. The login may be associated with hosted application 508, an application environment associated with hosted application 508, or even an operating system environment associated with hosted application 508. Alternatively, the login may be associated with content service 530. For example, user 501 may login to a client application associated with content service 530 in order to gain access to documents and other content stored by content service 530. This identity may then be used to identify user 501 to settings service 520.

Application service 540 then initiates a request for settings specific to user 501, which is transferred for delivery to settings service 520 over communication network 518. Alternatively, hosted application 508 may make this request, instead of application service 540. Settings service 520 receives the request and responsively retrieves the updated version of settings 521 and provides the settings 521 in their updated form to application service 540, or alternatively to hosted application 508. Application service 540 can then apply settings 521 to the instance of productivity application 543 experienced on client device 507, represented by hosted application 508. Alternatively, hosted application 508 may apply the settings itself, communicated to it by application service 540 or settings service 520.

Hosted application 508 may also initiate a request for document 531 that is communicated through application service 540. Application service 540 receives the request and communicates a document request to content service 530 to obtain the requested document. Content service 530 provides document 531 to application service 540, which applies portions of settings 521 relevant to document 531. Application service 540 then presents document 531 to user 501 by way of hosted application 508 running on client device 507, thereby allowing user 501 to experience document 531 by way of hosted application 508 in a manner similar to when experienced through installed application 504. In the alternative whereby hosted application 508 communicates with settings service 520 to obtain the user-specific roaming settings, instead of hosted application service 540, hosted application 508 may apply the settings to document 531.

In yet another alternative, content service 530 may be capable of communicating with settings service 520 to obtain the roaming settings specific to either user 501 or user 502. In this alternative, the user may be identified to content service 530 by way of an application login, a login process associated with content service 530, or in some other manner. Upon a content item being requested by an application on behalf of the user, content service 530 may communicate with settings service 520 to retrieve the roaming settings. Content service 530 may then provide both the content item and the roaming settings to the requesting application, regardless of the application model according to which the application may be provided. For instance, content service 530 can communicate the roaming settings to applications installed locally on, streamed to, or running in a hosted fashion on client devices 503, 505, 507, 509, and 511. In addition, content service 530 can communicate the roaming settings to hosted application service 540.

It should be understood that user 502 may experience a similar scenario with respect to installed application 510 and hosted application 512 as described above with respect to user 501 in FIG. 7.

Figure 8:
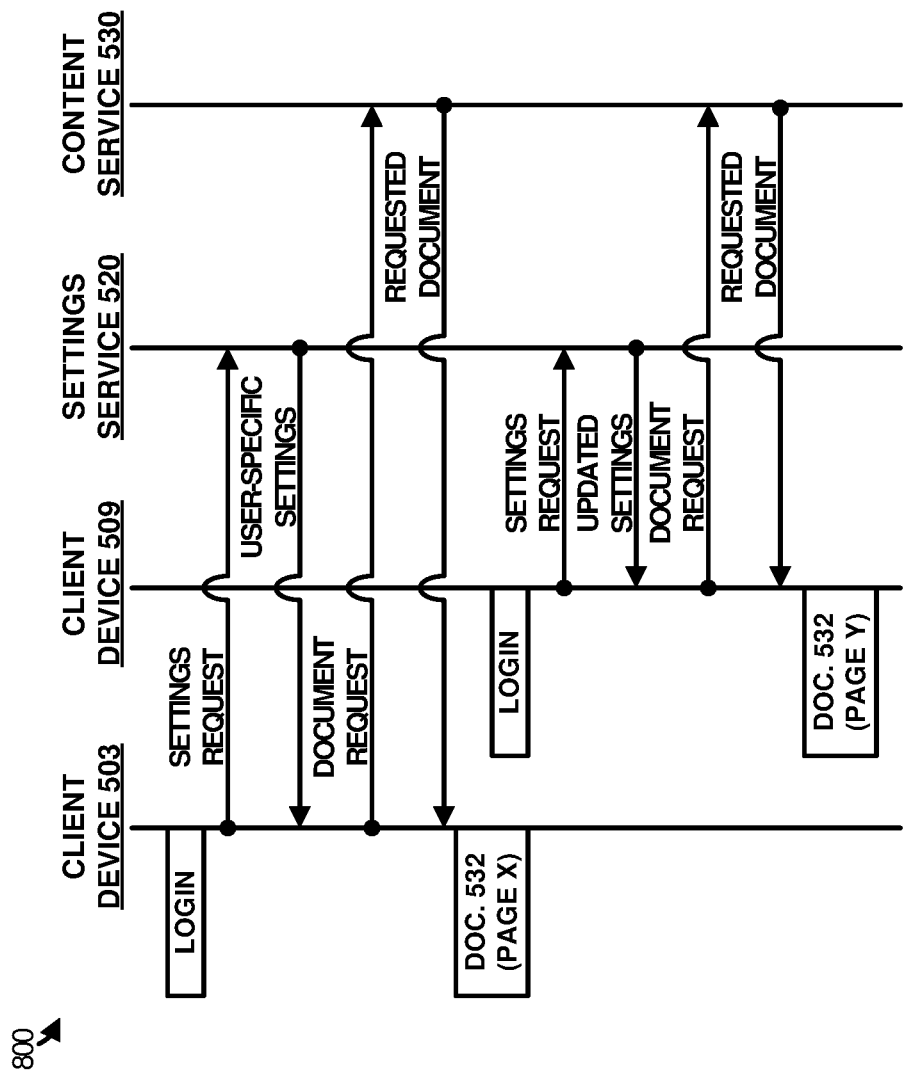
FIG. 8 is a sequence diagram that illustrates an operational exchange within a computing environment when providing a roaming settings service in an implementation.

FIG. 8 illustrates an operational exchange 800 whereby settings specific to user 501 and settings specific to user 502 are both applied to shared content so that each user may experience customized settings with respect to the same content.

Initially, user 501 logs into or otherwise is identified to installed application 504 on client device 503. Upon user 501 being identified, installed application 504, by way of client device 503, initiates a settings request that is transferred for delivery over communication network 518 to settings service 520. The settings request identifies user 501, allowing settings service 520 to retrieve settings 521 specific to user 521. Settings service 521 returns settings 521 to client device 503 for loading in installed application 504.

At the same time, before, or after the settings request, installed application 504 also initiates retrieval of shared document 532 from content service 530. Content service 530 provides document 532 to client device 503. Installed application 504 can then apply portions of settings 521 relevant to shared document 532. In an example of settings applied to shared document 532, such settings allow user 501 to experience share document 532 in a customized manner relative to user 502. For example, settings 521 may identify the last page (page X) accessed by user 501 in shared document 532, while settings 522, discussed below, may identify the last page (page Y) accessed by user 502 in shared document 532.

In the meantime, user 502 may engage with installed application 510 on client device 509. User 502 is identified by way of a login or some other identification mechanism. Installed application 510 initiates a request for settings by way of client device 509, which is transferred for delivery to settings service 520 over communication network 518. Settings service 520 receives the request and responsively retrieves settings 522 specific to user 502 and provides the settings 522 to installed application 510.

Installed application 510 may also retrieve shared document 532 from content service 530. Content service 530 provides document 532 to client device 509. Installed application 510 can then apply portions of settings 522 relevant to shared document 532. In an example of settings applied to shared document 532, such settings allow user 502 to experience share document 532 in a customized manner relative to user 501. For example, settings 522 may identify the last page (page Y) accessed by user 502 in shared document 532, while settings 521, discussed above, may identify the last page (page X) accessed by user 502 in shared document 532.

FIG. 9 illustrates an operational exchange 900 pertaining to a failure of settings service 521. In operational exchange 900, settings updates are provided to settings service 521 with a generation identifier attached or otherwise included therewith. For example, client device 503 provides a generation identifier to settings service 521 upon initiation of an update by installed application 504. Similarly, client device 505 provides a generation identifier to settings service 521 upon initiation of an update by installed application 506.

At any given moment a failure could occur that disables all or a portion of settings service 521. For instance, settings 521 specific to user 501 may be deleted, corrupted, or otherwise rendered unavailable. In response to detection of a failure condition, settings service 521 is capable of analyzing a generation store, where generation identifiers may be stored in association with application instances, to determine which application instance should be queried for the most recent version of settings 521 associated with user 501.

In this example, it is determined for illustrative purposes that the generation identifier provided by client device 503 represents the most recent generation identifier. Accordingly, settings service 521 makes a repair request to installed application instance on client device 503 to provide a complete, or nearly complete, copy of settings 521. In this manner, settings service 520 can obtain settings 521 and moving forward allow settings 521 to roam to other devices and application instances engaged by user 501.

In an alternative, rather than provide generation identifiers along with settings updates, the various application instances running on client devices 503 and 505 may simply track their respective settings updates. Then in response to a failure, settings service 520 may query client devices 503 and 505 for their respective generation identifiers. At that time, client devices 503 and 505 can provide their respective generation identifiers for analysis by settings service 520 to determine the location of the most recent copy of settings 521 with which to respond to the failure.

In an operational example of a roaming settings service, the service receives an update to roaming settings specific to a user indicative of at least an interaction of the user with a content item while engaged with an instance of an application program provisioned according to a first application model that hosts the content item. Later, the service receives a request for the roaming settings specific to the user initiated by an instance of the application program provisioned according to a second application model that hosts the content item. In response to the request, the service retrieves updated roaming settings that reflect the update to the roaming settings indicative of at least the interaction of the user with the content item while engaged with the instance of the application program provisioned according to the first application model. The service transfers the updated roaming settings for delivery to the instance of the application program provisioned according to the second application model.

In one scenario, the application program may be a productivity application and the content item may be a productivity document. In addition, the interaction of the user with the content items may be a place in the productivity document most recently accessed on behalf of the user. In a variation, the productivity document may be at least one of a word processing document, a spreadsheet document, or a presentation document, as well as any other kind of productivity document.

In another scenario, the productivity document may be a shared productivity document. In such a case, the service may receive another request for roaming settings specific to another user indicative of an interaction of the other user with the shared productivity document while engaged with another instance of the application program provisioned according to the second application model. In response to the other request, the service retrieves the relevant roaming settings and transfers the roaming settings for delivery to the other instance of the application program. The interaction of the other user with the shared productivity document correspond to place in the productivity document most recently accessed on behalf of the other user.

In some implementations, the first application model may be a local installation model where the update is communicated by a client device having the instance of the application program provisioned according to the first application model locally installed thereon. The second application model may be a hosted application model and the update may be communicated from an application server having the instance of the application program provisioned according to the first application model hosted thereon.

In one scenario, the service is capable of generating and transferring a repair request for delivery to at least one instance of the application program provisioned according to the first application model to obtain a copy of the roaming settings in response to a failure condition.

In yet another scenario, the service is capable of communicating user-specific roaming settings that may be applied by different kinds of applications. For example, roaming settings may be applied by a word processing application as well as a spreadsheet application. In such a scenario, the service receives a request for roaming settings specific to a user initiated by an instance of a productivity application that hosts a document. In response to the request, the service retrieves updated roaming settings that reflect an update to the roaming settings indicative of at least an interaction of the user with a content item while engaged with an instance of a different application program. The service transfers the updated roaming settings for delivery to the instance of the productivity application. Examples of settings that may apply to different types of applications include custom dictionaries, macros, custom clip art, and templates, as well as many other kinds of settings. For instance, the user may make a modification to a custom dictionary, such as adding a word to the custom dictionary while engaged with a word processing document. Then when engaged with a presentation application, the custom dictionary will have that word included therein.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A computing apparatus comprising:
   one or more computer readable storage media;
   a processing system operatively coupled with the one or more computer readable storage media; and
   program instructions stored on the one or more computer readable storage media for providing a roaming settings service that, when executed by the processing, direct the processing system to at least:
   receive an update to roaming settings specific to a user and an application program and at least indicative of at least an interaction of the user with a shared content item while engaged with an instance of the application program provisioned according to a first application model that hosts the shared content item;
   receive a request for the roaming settings specific to the user initiated by an instance of the application program provisioned according to a second application model that hosts the shared content item;
   in response to the request, retrieve updated roaming settings that reflect the update to the roaming settings indicative of at least the interaction of the user with the shared content item while engaged with the instance of the application program provisioned according to the first application model and transfer the updated roaming settings for delivery to the instance of the application program provisioned according to the second application model;
   generate and transfer a repair request for delivery to at least two instances of the application program;
   receive responses to the repair request from the at least two instances of the application program, where each response comprises a generation identifier;
   identify from the generation identifier in each of the responses which of the at least two instances of the application program to query for the roaming settings; and
   request the corresponding update to the roaming settings from an identified one of the at least two instances of the application program.

2. The computing apparatus of claim 1 wherein the application program comprises a productivity application, wherein the shared content item comprises a shared productivity document, and wherein the interaction of the user with the content item comprises a page in the shared productivity document most recently accessed on behalf of the user.

3. The computing apparatus of claim 2 wherein the shared productivity document comprises at least one of a word processing document, a spreadsheet document and a presentation document.

4. The computing apparatus of claim 2 wherein the program instructions, when executed by the processing system, further direct the processing system to:
   while the user is engaged with the shared document, receive a second request for second roaming settings specific to a second user indicative of at least a second interaction of the second user with the shared productivity document while engaged with a second instance of the application program provisioned according to the second application model; and
   in response to the second request, retrieve the second roaming settings and transfer the second roaming settings for delivery to the second instance of the application program;
   wherein the second interaction of the second user with the shared productivity document comprises a second page in the productivity document most recently accessed on behalf of the second user.

5. The computing apparatus of claim 1 wherein the first application model comprises a local installation model, wherein the processing system communicates with a client device having the instance of the application program provisioned according to the first application model locally installed thereon.

6. The computing apparatus of claim 5 wherein the second application model comprises a hosted application model, wherein the processing system communicates with an application server having the instance of the application program provisioned according to the first application model hosted thereon.

7. The computing apparatus of claim 6 wherein the program instructions, when executed by the processing system in response to a failure condition in the roaming settings service, direct the processing system to generate and transfer the repair request for delivery to the at least two instances of the application program.

8. The computing apparatus of claim 7 wherein the generation identifier is indicative of when a corresponding update to the roaming settings for the user occurred.

9. The computing apparatus of claim 8 wherein the roaming settings specific to the user comprise a custom dictionary and wherein the interaction of the user with the shared content item while engaged with the instance of the application program provisioned according to the first application model comprises a modification to the custom dictionary.

10. A method of operating a roaming settings service, the method comprising:
   receiving an update to roaming settings specific to a user indicative of at least an interaction of the user with a shared content item while engaged with an instance of an application program provisioned according to a first application model that hosts the shared content item;
   receiving a request for the roaming settings specific to the user initiated by an instance of the application program provisioned according to a second application model that hosts the shared content item; and
   in response to the request, retrieving updated roaming settings that reflect the update to the roaming settings indicative of at least the interaction of the user with the shared content item while engaged with the instance of the application program provisioned according to the first application model;

transferring the updated roaming settings for delivery to the instance of the application program provisioned according to the second application model;

transferring a repair request for delivery to at least two instances of the application program;

receiving responses to the repair request from the at least two instances of the application program, where each response comprises a generation identifier:

identifying from the generation identifier in each of the responses which of the at least two instances of the application program to query for the roaming settings; and requesting the corresponding update to the roaming settings from an identified one of the at least two instances of the application program.

11. The method of claim 10 wherein the application program comprises a productivity application, wherein the shared content item comprises a shared productivity document, and wherein the interaction of the user with the shared content item comprises a page in the productivity document most recently accessed on behalf of the user.

12. The method of claim 11 wherein the productivity document comprises at least one of a word processing document, a spreadsheet document and a presentation document.

13. The method of claim 11 wherein the method further comprises:

receiving a second request for second roaming settings specific to a second user indicative of at least a second interaction of the second user with the shared productivity document while engaged with a second instance of the application program provisioned according to the second application model;

in response to the second request, retrieving the second roaming settings; and transferring the second roaming settings for delivery to the second instance of the application program;

wherein the second interaction of the second user with the shared productivity document comprises a second page in the productivity document most recently accessed on behalf of the second user.

14. The method of claim 10 wherein the first application model comprises a local installation model and wherein receiving the update comprises receiving the update from a client device having the instance of the application program provisioned according to the first application model locally installed thereon.

15. The method of claim 14 wherein the second application model comprises a hosted application model and wherein receiving the update comprises receiving the update from an application server having the instance of the application program provisioned according to the first application model hosted thereon.

16. The method of claim 15 wherein transferring the repair request occurs in response to a failure condition.

17. The method of claim 10 wherein the generation identifier is indicative of when a corresponding update to the roaming settings for the user occurred.

* * * * *